United States Patent
Aichinger et al.

(10) Patent No.: US 10,336,476 B2
(45) Date of Patent: Jul. 2, 2019

(54) METHOD FOR MONITORING A FILLED CONTAINER AND MONITORING SYSTEM FOR FILLED CONTAINERS

(71) Applicant: KRONES AG, Neutraubling (DE)

(72) Inventors: Karl Aichinger, Metten (DE);
Reinhard Klinger, Bernhardswald (DE)

(73) Assignee: KRONES AG, Neutraubling (DE)

( * ) Notice: Subject to any disclaimer, the term of this patent is extended or adjusted under 35 U.S.C. 154(b) by 135 days.

(21) Appl. No.: 15/126,240

(22) PCT Filed: Feb. 26, 2015

(86) PCT No.: PCT/EP2015/054006
§ 371 (c)(1),
(2) Date: Sep. 14, 2016

(87) PCT Pub. No.: WO2015/144379
PCT Pub. Date: Oct. 1, 2015

(65) Prior Publication Data
US 2017/0081052 A1    Mar. 23, 2017

(30) Foreign Application Priority Data
Mar. 28, 2014 (DE) .......... 10 2014 104 375

(51) Int. Cl.
*B65B 1/46* (2006.01)
*B67C 3/24* (2006.01)
(Continued)

(52) U.S. Cl.
CPC .......... *B65B 1/46* (2013.01); *B07C 5/16* (2013.01); *B07C 5/32* (2013.01); *B07C 5/3404* (2013.01);
(Continued)

(58) Field of Classification Search
CPC .... G01G 15/00; G01G 15/006; G01G 19/035; G01G 19/14; B65B 1/46; B07C 5/16;
(Continued)

(56) References Cited

U.S. PATENT DOCUMENTS 3,198,271 A    8/1965  Good
3,878,909 A *  4/1975  Treiber .................. B65B 35/20
                                                       177/145
(Continued)

FOREIGN PATENT DOCUMENTS

CN    101658683 A    3/2010
CN    102556915 A    7/2012
(Continued)

OTHER PUBLICATIONS

Computer translation of EP2161202 from the EPO website. Apr. 4, 2018.*
(Continued)

*Primary Examiner* — Randy W Gibson
(74) *Attorney, Agent, or Firm* — Marshall, Gerstein & Borun LLP

(57) ABSTRACT

A method for monitoring a filled container, in particular a filled beverage container, which is conveyed on a conveyor, comprising the steps of taking up the container by a carriage, creating a spacing between the container and the conveyor, so that the entire weight of the container is retained by the carriage in a weighing region, and weighing the retained container in the weighing region using a load cell comprised by the carriage, the carriage being driven by a linear motor according to said method, and a monitoring system for filled containers, in particular filled beverage containers, for executing such a method.

17 Claims, 1 Drawing Sheet

(51) Int. Cl.
*B65G 15/00* (2006.01)
*G01G 15/00* (2006.01)
*G01G 19/14* (2006.01)
*G01G 19/03* (2006.01)
*B67C 3/00* (2006.01)
*B67C 3/20* (2006.01)
*B07C 5/16* (2006.01)
*B07C 5/34* (2006.01)
*B07C 5/32* (2006.01)
*B65G 43/08* (2006.01)

(52) U.S. Cl.
CPC ............. *B65G 43/08* (2013.01); *B67C 3/007* (2013.01); *B67C 3/202* (2013.01); *G01G 15/006* (2013.01); *G01G 19/035* (2013.01); *G01G 19/14* (2013.01); *B65G 2203/0258* (2013.01)

(58) Field of Classification Search
CPC ......... B07C 5/32; B07C 5/3404; B65G 43/08; B65G 2203/0258; B67C 3/007; B67C 3/202
USPC ........................................................ 177/145
See application file for complete search history.

(56) References Cited

U.S. PATENT DOCUMENTS

| | | | | |
|---|---|---|---|---|
| 4,023,668 A * | 5/1977 | De Santo | ................ | G01G 3/08 177/145 |
| 4,344,493 A * | 8/1982 | Salmonsen | .......... | G01G 13/026 177/145 |
| 4,566,584 A * | 1/1986 | Lindstrom | ........... | G01G 11/003 177/145 |
| 5,230,391 A * | 7/1993 | Murata | .................. | G01G 11/00 177/145 |
| 5,814,772 A * | 9/1998 | Nishimura | ........... | G01G 11/046 177/145 |
| 6,073,667 A * | 6/2000 | Graffin | .................... | B67C 3/202 141/372 |
| 6,084,184 A * | 7/2000 | Troisi | ..................... | G01G 15/00 177/145 |
| 6,359,240 B1 | 3/2002 | Dutto et al. | | |
| 8,821,788 B2 | 9/2014 | Krueger et al. | | |
| 8,872,045 B2 | 10/2014 | Sobiech | | |

FOREIGN PATENT DOCUMENTS

| | | |
|---|---|---|
| CN | 103057731 A | 4/2013 |
| DE | 19703528 A1 | 8/1998 |
| DE | 102006062536 A1 | 7/2008 |
| DE | 102008048774 A1 | 4/2010 |
| DE | 102011084721 A1 | 4/2013 |
| DE | 102011086708 A1 | 5/2013 |
| DE | 102012000758 A1 | 7/2013 |
| EP | 0636574 A1 | 2/1995 |
| EP | 1156301 A1 | 11/2001 |
| EP | 1698586 A1 | 9/2006 |
| EP | 1025424 B2 | 3/2008 |
| EP | 1955949 A1 | 8/2008 |
| EP | 2161202 A1 | 3/2010 |
| EP | 2583931 A1 | 4/2013 |
| GB | 1271085 A | 4/1972 |
| JP | 9271734 A2 | 10/1997 |
| JP | 9271737 | 10/1997 |
| JP | 2001039493 A | 2/2001 |
| JP | 2003126787 A | 5/2003 |
| JP | 3101355 U | 6/2004 |
| JP | 2007108068 A | 4/2007 |
| WO | WO-9920991 A1 | 4/1999 |
| WO | WO-2010034388 A1 | 4/2010 |

OTHER PUBLICATIONS

Computer translation of EP2583931 from the EPO website. Apr. 4, 2018.*
Computer translation of DE102011086708 from the EPO website. Apr. 4, 2018.*
Chinese Office Action with English Translation for Application No. 201580016704.0, dated Jul. 12, 2017.
Notification of the Second Chinese Office Action with English Translation for Application No. 201580016704.0, dated Feb. 8, 2018.
International Search Report for International Application No. PCT/EP2015/054006, dated May 12, 2015.
German Search Report for Application No. 102014104375.8, dated Mar. 25, 2015.
International Preliminary Report on Patentability and Written Opinion of the International Search Authority for international application No. PCT/EP2015/054006, dated Oct. 4, 2016.
Japanese Office Action with English Translation for Application No. 2016-558192, dated Sep. 18, 2018.
Chinese Office Action with English Translation for Application No. 201580016704.0, dated Aug. 10, 2018.

* cited by examiner

METHOD FOR MONITORING A FILLED CONTAINER AND MONITORING SYSTEM FOR FILLED CONTAINERS

CROSS-REFERENCE TO RELATED APPLICATION

The present application is the US national phase of International Patent Application No. PCT/EP2015/054006, filed Feb. 26, 2015, which application claims priority to German Application No. DE 102014104375.8, Mar. 28, 2014. The priority application, DE 102014104375.8, is hereby incorporated by reference.

FIELD OF THE DISCLOSURE

The present invention relates to a monitoring system for filled containers and to a method for monitoring filled containers.

BACKGROUND

It is known to control, after the process of filling beverages or other liquids into containers, the fill level of each individual container so as to guarantee that deviations from the target value of the filling content of the container are not excessively high. Typically, containers exhibiting an excessive deviation from the target value of the filling content are rejected from the production stream.

It is e.g. known to measure the fill level optically, by means of high frequency, by means of X-ray or gamma radiation or similar methods. The measuring accuracy is, however, reduced substantially, if the liquid still foams or swashes due to a movement of the container.

Moreover, the fill level can, typically, only be analyzed with a low accuracy of approx. 2 to 3 mm height. In addition, containers, e.g. containers made of plastic, may expand during the filling and conveying procedure, whereby the measurement will become even more inaccurate and e.g. correction factors will have to be used (cf. e.g. DE 10 2006 062 536). Furthermore, optical methods are not suitable for use with containers that are opaque in the area of the upper level of fill, e.g. because they are tin-foiled or labeled in the neck area.

Typically, devices measuring such fill levels must be calibrated individually for each product. In so doing, e.g. the formation of foam of the particular product in the specific plant and/or the temperature and/or the pressure and/or the color of the bottle and/or the product must be taken into consideration. This makes the setting of such devices very expensive, in particular when they are intended to be used with a plurality of products.

It is the object of the invention to solve one or several problems of the prior art.

SUMMARY OF THE DISCLOSURE

The present invention includes a method for monitoring filled containers, a monitoring system for filled containers, as well as a machine-readable medium.

Filled containers may include e.g. plastic, glass or metal, and may be filled with a liquid, e.g. a beverage. In particular, such filled containers may be filled beverage containers. The filled containers may be or may include e.g. filled beverage bottles consisting e.g. of glass or plastic material, e.g. PET, and/or filled beverage cans.

The method may be a method for monitoring filled, closed containers. A monitoring system, in particular a monitoring system described hereinbelow, which may be configured for monitoring filled, closed containers.

The method for monitoring a filled container, in particular a filled beverage container, includes taking up a filled container, which is conveyed on a conveyor, by means of a carriage. After having been taken up, the container is retained by the carriage. The method additionally included creating a spacing between the container and the conveyor, so that the entire weight of the container is carried by the carriage in a weighing region, and weighing the retained container in the weighing region using a load cell comprised by the carriage. According to the method, the carriage is driven by a linear motor. The linear motor may be configured e.g. like a linear motor described hereinbelow in connection with the monitoring system. At a moment in time after the weighing, the container is typically released from the carriage.

Optionally, the method may include the step of discharging, after weighing, the retained container from the conveyor onto a discharge unit, the container being here discharged by the carriage (i.e. by making use of the carriage), e.g. guided to a discharge unit where it is released. Alternatively, the method may optionally include the step of moving, after weighing, the retained container to a position close to the conveyor and releasing the container on the conveyor.

The method may additionally comprise monitoring a plurality of containers (e.g. one after the other), the spacing between the individual carriages being here optionally varied. For example, the speed of the carriage may be changed, e.g. while a container is being conveyed in the weighing region (i.e. while the conveyor and the container are spaced apart), e.g. such that the carriage will be moved closer to the preceding carriage or such that the distance to said preceding carriage will be enlarged, or such that the retained container can be put down at a speed other than the speed at which it has been taken up. This allows the distance between the individual containers retained by the carriages to be varied, e.g. without the variation causing friction between the conveyor and without the respective container and the noise resulting therefrom. In other cases, the speed of a carriage and/or the distance from one carriage to the next can be varied, when these carriages do not retain any containers, a carriage may here e.g. be accelerated to the speed of a container to be taken up and/or decelerated when a container has been put down.

The method may be executed e.g. in a monitoring system described hereinbelow. Irrespectively of whether or not it is executed in a device described hereinbelow, it may include one of the additional steps, which will be described hereinbelow in connection with the monitoring system, or an arbitrary combination of a plurality of or of all these steps described in connection with a monitoring system. It may e.g. include detecting a container by means of a sensor, adjusting the speed of the carriage, examining leakage through a squeeze function, adjusting the carriage and/or the linear drive to a container size and/or other steps, which will be described hereinbelow in connection with a monitoring system. For example, the method may comprise monitoring a plurality of filled containers, in particular filled beverage containers, with a plurality of carriages. Hence, it may be configured as a method for monitoring filled containers. In this context, it may include e.g. the step of adapting the speed of each carriage (optionally independently of the speed of some other carriage).

A monitoring system for filled containers may be installed e.g. downstream of a filling machine, and a method may be executed after filling of the container. A monitoring system may be installed between a filling machine and a labeling station, so that the filled containers can be monitored before a label is attached thereto, and the method may be executed between the filling of the container and the labeling of the container.

The method and/or the monitoring system is/are configured for monitoring containers which are conveyed on a conveyor. A monitoring system may especially be configured for executing an above described method. A monitoring system may include the conveyor or may be configured such that it can be attached to or installed next to a conveyor not comprised by the monitoring system.

Typically, the conveyor is configured as a single-track conveyor, so that the containers are conveyed one after the other. The conveyor may be configured e.g. as a conveyor belt and/or a conveyor chain or it may comprise these components. The conveyor may be configured in one piece, i.e. without any interruption. The conveyor may be configured as a straight track (without any curves) for the containers or it may comprise a straight track for the containers. Alternatively or additionally, the conveyor may include one or a plurality of curves and/or a transfer section and/or it may be interrupted, two parts of the conveyor being in this case optionally operable at two different speeds.

A monitoring system according to the present invention includes a plurality of carriages, which are also referred to as movers.

When the characteristics of a carriage (of the carriage) are described hereinbelow, a plurality of or all of the carriages comprised by the monitoring system may exhibit these characteristics. Only for the sake of the simplicity of language, a carriage (the carriage) is referred to.

Each of the steps which are executable by the described characteristics of a carriage and each other step executable in the monitoring system may be provided individually or as a combination of a plurality of thus described steps as step(s) of an above described method.

The carriage is configured such that it is capable of retaining a container, e.g. a container conveyed on the conveyor, and that it comprises means for weighing the retained container. A monitoring system may comprise more than 5, more than 10 or more than 25 of such carriages.

The load cell comprised by the carriage can be used for determining the weight of the retained container.

A load cell may comprise e.g. a piezo element for determining the weight of the filled container.

A load cell may be configured e.g. in the way described in EP 1 025 424 B2.

Due to the fact that the container is retained by the carriage, the container can be guided, e.g. around a sharp bend, without losing the assignability of the containers (knowledge of the original sequence), as is often the case with prior art systems. This may e.g. be of advantage, since the monitoring system can thus be arranged e.g. at the machine exit of a container treatment machine (e.g. a filling machine) and can take hold of the containers at the exit of the container treatment machine and can then guide them around a curve before the containers are weighed, without the assigned position of the container getting lost. This can e.g. allow a space-saving arrangement or design of the monitoring system.

Weighing the filled container, which is retained by a carriage, is typically advantageous, since, in particular as regards plastic containers or metal containers, the weight of the individual containers is typically very constant and known, e.g. with deviations of 1 g or less. The fill quantity can thus be determined from the total weight with high accuracy. (The deviations can thus be significantly lower than values of 10 ml per 1 liter, which apply in Germany; in the case of typical optical measurement methods this is often only possible by making use of additional correction means.). In addition, the result of the measurement is typically independent of foaming or swashing of the liquid. A measurement is typically also possible for containers, in which optical systems fail, e.g. containers that are tin-foiled or labeled or opaque in the neck area, i.e. also after the labeling process and/or a labeling machine, by way of example.

Typically, the carriage is movable in the monitoring system and movable in at least one area along the conveyor, typically (approximately) parallel to the conveyor. The carriage may e.g. be moved along a predetermined track extending, in at least one area thereof, along the conveyor. The carriage may be freely movable, individually controllable and exactly positionable along the track.

The monitoring system may be configured such that the position of the carriage can be determined continuously. Position determination can be executed e.g. by a control system. Alternatively or additionally, position determination can be executed by other means, e.g. sensors, or a position detection of the carriage. The position determined may be transmitted e.g. to a control system.

In a monitoring system, the carriage or the carriages may be movable along a track. The track may comprise a mechanical guide, such as a strip, a metal rail or the like. In a monitoring system comprising a plurality of carriages, the track will normally be the same for all carriages.

In the area where the carriage is movable along the conveyor, the track of the carriage in the monitoring system is or may be typically arranged such that the carriage will be able to retain a filled container conveyed on the conveyor. The carriage can here be guided alongside and/or above the conveyor.

Typically, the carriage can be moved such that, in an area where it is moved along the conveyor, it can be moved at the speed of the conveyor. This allows a container to be taken hold of by the carriage and/or to be retained while it is being conveyed on the conveyor and/or to be released on the conveyor, without high accelerations of the container being caused. While the container is being retained, a weight measurement can be executed in a weighing region through the means for weighing the retained container.

In the weighing region, the whole weight of the container must be carried by the carriage. This is normally done by creating a spacing between the conveyor and the container. This may be accomplished e.g. in that, in the weighing region, the conveyor is (slightly) lowered and/or interrupted and/or the track of the carriage is (slightly) raised. At the beginning and at the end of the weighing region, the direction of movement of the carriage along the conveyor is therefore typically almost, but not fully parallel.

The lowering of the conveyor and/or the rise in the track of the carriage may be small, and may e.g. amount to a value between 2 mm and 3 cm, or between 2 mm and 1 cm, in comparison with the normal height of the conveyor and/or of the track of the carriage. This may be advantageous, since, even if a container is not retained by the carriage, e.g. because it has not been taken hold of precisely, the container will then not interfere with the further course of the procedure in some embodiments, but will be able to simply continue its travel on the conveyor and will be entrained by the production stream.

Typically, the weighing region is selected such that it is sufficiently large or it is adjustable such that the weight of the container can be determined in this area with the accuracy required for the product in question. The length of the weighing region may here depend on the period of time required for weighing the container (e.g. 100 ms or more) and on the typical speed of the conveyor. A weighing region may have e.g. a length of 50 cm or more. The longer the weighing region is the higher the accuracy of weight determination will be.

The monitoring system comprises a linear motor as a drive for the carriage. The drive may comprise a magnetic drive (e.g. MagneMotion) or it may be configured as such a magnetic drive. Each carriage may be controllable individually by the linear motor, i.e. independently of the other carriages.

Making use of such a linear motor, the monitoring system may be configured such that the track of the carriage may comprise sharp bends and/or run upwards and/or downwards from a horizontal plane and/or may be bendable (e.g. electrically adjustable). This allows a space-saving arrangement of the monitoring system and/or an adaptation of the height of the carriage.

The current position of the carriage can be detected e.g. by means of sensors.

A carriage may retain the container e.g. by means of a (mechanical) clamping device. A (mechanical) clamping device may comprise e.g. a clamp, or it may be configured as a clamp. For example, the monitoring system may be configured such that a clamping device will be able to act on the neck area of a plastic bottle or on the carrying ring thereof, or, in particular in the case of cylindrical containers, e.g. on the body area. Alternatively or additionally to a clamping device, e.g. a suction device or some other fastening facility may be used. The filled container may be retained from above and/or from the side of the container.

A (mechanical) clamping device, a suction device and/or other fastening facilities may be controllable, e.g. by pneumatically or electrically driven actuators. According to some embodiments, this control may be executed at any point of the track of the carriage. Typically, the container can be taken hold of as well as released at any point of the track of the carriage. A pneumatically or electrically driven actuator may be controllable e.g. by a control system. Data transmission, e.g. from and to the carriage (e.g. result transmission, parameter transmission, control parameters etc.), may here be executed in a wireless fashion, e.g. via WLAN or coupling elements in the current supply. The power supply of the actuators on the carriage, e.g. the current supply, may be effected in a wireless fashion. According to some embodiments, at least one energy store is arranged on the carriage, e.g. near the load cell, said energy store comprising electric energy for supplying the actuator and/or a microprocessor and/or the load cell. Such an energy store may be configured e.g. as a current storage device, e.g. a battery or a rechargeable battery.

In a monitoring system, the track of the carriage may be arranged or adapted to be arranged such that the track of the carriage or carriages approaches, e.g. by a curve, the conveyor at one or both of the limits of the area in which the track runs along the conveyor. This leads to a change in the distance between the carriage or carriages and the conveyor, so that, when travelling along the track, a carriage will be guided towards the conveyor, and in particular towards a container conveyed on the conveyor, and/or, after the area in which the track runs along the conveyor, away from the conveyor. This applies especially to cases where the carriage or the carriages are arranged such that they circulate in a loop.

Thus, it is e.g. possible to guide the carriage towards the container such that the latter is moved into the (mechanical) clamping device, towards the suction device and/or towards other fastening facilities. Subsequently, these components can be closed/operated and the container can be retained, e.g. while continuing its travel on the conveyor. Subsequently, e.g. the (mechanical) clamping device or suction device or other fastening facilities may be opened and the carriage may be moved away from the conveyor, e.g. in the event that the container is intended to continue its travel on the conveyor.

Alternatively, the (mechanical) clamping device or suction device or other fastening facilities may be opened, when the container is at a different position, e.g. located on or near to a discharge unit, e.g. if the weight of the container should not be within the tolerance limits.

A monitoring system may be adaptable to one or more container types.

For example, the height of the track of the carriage may be adaptable or the carriage may be exchangeable. Alternatively or additionally, the height of the carriage above the conveyor may be adaptable by adapting the height of the conveyor and/or by adapting (e.g. electrically) the height of the linear motor, and/or of the track, e.g. in cases where a bendable linear motor and/or track is used. According to some embodiments, the gripping height of the clamping or suction device or of other fastening facilities on the carriage may be adjustable additionally or alternatively. In a monitoring system, the carriage may be removable and/or exchangeable individually and/or carriages for various container types may be comprised. The target weight of a filled container may be adjustable as well as the desired tolerance limits within which deviations from the target weight will still be accepted. The drive for the carriage may be controllable depending on the rate of the retained container.

In a monitoring system of the type described it will normally suffice to know, for the purpose of parametrization, the weight of the container including the cover, e.g. of the cover and the preform (and consequently the weight of the container and of the cover), and the weight of the liquid as well as the tolerance limits. Parametrization can be effected e.g. by inputting the desired parameters into the control system. Hence, the adjustment of the monitoring system for a container type including the product in question can typically be executed much more easily than in the case of known, in particular optical, measurement methods, which typically necessitate a specialist on site for the adjustment of each container type including the product in question, it being also necessary to produce said product, so that, typically, the specialist will have to pay another visit for each new product.

The monitoring system may be configured such that it is capable of receiving and taking into account additional signals, e.g. signals from one or a plurality of sensors, which also monitor the container. These sensors may be comprised in the monitoring system or they may be provided separately of the latter. A monitoring system may be configured such that, in response to such signals, the container may, for example, be discharged from the conveyor, e.g. onto an optional discharge unit.

The monitoring system may especially comprise a sensor which is capable of detecting the presence of a container at a location on the conveyor, e.g. at the beginning of the conveyor. Alternatively or additionally, the monitoring system may comprise means, which determine the speed of the container, e.g. additional sensors or a rotary encoder, which is able to determine the speed of the conveyor.

The monitoring system may be configured such that the speed of each carriage is adjustable, typically independently of the speed of the other carriages. The speed may e.g. be adjustable such that the carriage can be moved precisely towards a container (e.g. such that the container will move into a clamping device), and will be able to take hold of said container and retain it subsequently. Previously, the carriage may have occupied e.g. a waiting position. The presence of the container may e.g. have been detected by a sensor and its speed may have been detected by an additional or the same sensor or by some other means, e.g. a rotary encoder. Such a sensor in the monitoring system may especially be suitable for detecting each individual container.

Typically, the carriages are also controllable individually, so that e.g. irregularities in the container supply or speed changes can be taken into consideration. Hence, in a system comprising a plurality of carriages, the spacing between the individuals carriages may be variable.

This can especially be used for varying the distances between the individual containers. For example, the system may be configured such that or may be controllable such that retained containers can be conveyed such that containers released on the conveyor are released at a previously specified distance from one another and/or at a specific speed. The distance variation and/or the speed change may, for example, take place on a transfer section or over an interruption of the conveyor so as to reduce noise emission. The conveyor may move at different speeds upstream and downstream of the transfer section or the interruption. Each carriage may be controllable such that, while a container is being conveyed on parts of the conveyor at different speeds, it will move at approximately the same speed as the respective part of the conveyor.

An arrangement comprising a plurality of carriages is advantageous insofar as the throughput of the examined containers in the monitoring system only depends on the number of carriages, and that, typically, the containers need not be separated from one another to a high degree. Thus, the accelerating forces acting on the container are kept small. In addition, it is e.g. also possible to adjust the performance of the monitoring system, when the size does not change.

The monitoring system may comprise one or a plurality of discharge units, i.e. one or a plurality of possibilities of removing containers from the conveyor and discharging them, whereby these containers are removed from the production stream. For example, the discharge unit may include a discharge conveyor or a collecting bin, e.g. a receptacle. Making use of a plurality of discharge units, the monitoring system may be configured such that containers can be discharged, e.g. according to different criteria onto various discharge units. For example, a discharge unit may be arranged at an angle relative to the conveyor, e.g. at an angle of 90° or at an acute or obtuse angle, so that the containers can be discharged via a transfer section (alternatively without a transfer section) from the conveyor onto the discharge track. An optional transfer section may be comprised by the monitoring system. Alternatively, the containers may be conveyed freely (e.g. displaced by 180° from the conveyor) onto a discharge track or to a collecting bin, where they can be released.

The carriage may be configured such that it is capable of discharging the retained container from the conveyor onto a discharge unit.

The monitoring system may e.g. be configured such or may be controllable such that the weight of the filled container is determined and, optionally, if the weight of the filled container does not lie within the tolerance limits for the product in question, the carriage will discharge the retained container from the conveyor onto a discharge unit, whereas, optionally—if the weight of the container lies within the tolerance limits specified for the product in question—said container can be released onto the conveyor, without high accelerations of the container occurring. Alternatively, the container may e.g. be discharged and e.g. released on a discharge unit, if e.g. the weighing result or signals received from the monitoring system necessitate a discharge of the container.

This control may be executed e.g. by a control system, e.g. a computer, comprised by the monitoring system. For the purpose of control, e.g. the result of the weighing of the filled container can be transmitted to the control system, e.g. via a wireless connection. Alternatively, the carriage may be configured such or may be programmable such that, if the weight does not lie within the tolerance limits, it will discharge the filled container.

In particular, the monitoring system may be configured such that—if weight examination shows that containers are not filled to a sufficient extent for standing stably, i.e. for being adapted to be discharged e.g. on a first discharge unit configured as a discharge conveyor—these containers can be entrained and released at a second discharge unit, which may comprise e.g. a collecting bin.

Alternatively or additionally, the monitoring system may comprise a waterdrop blow-off unit or it may be adapted to be attached to such a unit, which is provided in the prior art, e.g. ahead of cover monitoring means, e.g. in order to blow waterdrops off from covers. Since the containers are retained by carriages on the conveyor, the containers are stabilized and will not be blown over by a waterdrop blow-off unit, as might be the case in the prior art, especially if containers are filled only partly. The frequency of malfunctions caused by toppled containers can thus be reduced. The monitoring system may optionally also comprise a cover monitoring unit, in which the covers of containers can be monitored.

The carriage may be arranged such that it circulates in a loop in a monitoring system, i.e. it may e.g. move through a closed curve and/or comprise a closed curve. The track of the carriage may thus be a loop, e.g. a closed curve. This can be advantageous, since the carriage can thus easily be returned to the starting point for taking up another container.

The track of the carriage may extend approximately in a horizontal plane; a minor deviation may here optionally occur in the weighing region, e.g. when the track of the carriage is raised in said region. Alternatively, parts of the track may extend in a horizontal plane and other parts thereof in the other plane; for example, the track may in certain parts thereof extend upwards and/or downwards and/or it may be bendable and vertically adjustable (e.g. electrically).

The track of the carriage may, e.g. through a carriage track having the shape of a loop, be arranged or adapted to be arranged such that, when the carriage is being moved towards and/or away from the conveyor, the distance between the carriage and the conveyor can change.

A carriage may include, in addition to the load cell, means for applying pressure to the container, so that by a squeeze function, like that described e.g. in DE 197 03 528 A1, the leakproofness and/or the internal pressure of the container can be examined. The monitoring system may be configured such that, when pressure is being applied for the squeeze function, the force applied for pressing and/or the deformation of the container can be detected and evaluated. If, in the course of such a squeeze test, leakage and/or an internal pressure deviating from the desired internal pressure should be detected, the container may e.g. be discharged. This may be particularly advantageous, since e.g. a (mechanical) clamping device for retaining a container may simultaneously be suitable for executing a squeeze test, i.e. it may be used as a means for applying pressure to the container.

Through the examination of the internal pressure, such means for applying pressure to the container may also be used for examining the correct function of nitrogen injection, in particular an injection of liquid nitrogen into the container. In so doing, also the temperature of the container may optionally be taken into consideration. If the filled container should not have the desired internal pressure (within predetermined tolerance limits), it may e.g. be discharged. Additionally or alternatively, the measurement values may be detected and transmitted to a different system, where they can be used e.g. for controlling the injection of nitrogen.

According to other embodiments, the monitoring system may include additional means for examining the container, e.g. by measuring a deformation resulting e.g. from pressure applied to the container. The result obtained from these means may be taken into consideration for the discharge decision. These means may be configured as described e.g. in WO 99/20991.

The present invention additionally includes a machine-readable medium comprising machine-readable instructions, which, when executed by a processor, are capable of controlling a monitoring system of the type described hereinbefore and/or are capable of controlling the execution of a method of the type described hereinbefore.

BRIEF DESCRIPTION OF THE SEVERAL VIEWS OF THE DRAWINGS

Further aspects will be explained hereinbelow making reference to the figures, in which.

DETAILED DESCRIPTION OF THE PREFERRED EMBODIMENTS

Figure 1A:
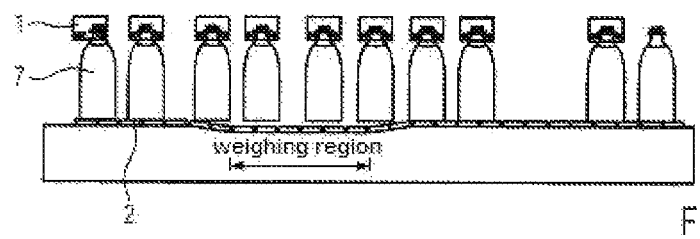
FIG. 1a shows a schematic representation of a side view of a part of a monitoring system.

FIG. 1a shows a schematic side view of a part of a monitoring system according to the present invention. Here, each filled container 7 is retained by a carriage 1 on the conveyor, which is depicted as a conveyor chain 2 in the present case, and is weighed in the depicted weighing region by the carriage. In the example shown, the containers are conveyed on a linear conveyor.

In the example shown, the conveyor is (slightly) lowered in the weighing region. A lowering of the weighing region may be accomplished e.g. by the use of thinner anti-wear strips or the like. This has the effect that, in this area, the whole weight of the filled container is carried by the carriage and the filled container can be weighed.

After the weighing, the filled container can be returned to the conveyor, which is depicted as a conveyor chain 2 in the present example, and advanced by the conveyor. Typically, this will be done if the weight lies within the desired tolerance limits, by way of example.

This arrangement is advantageous, since, if a container 7 is not correctly taken hold of by a carriage, the container can nevertheless be advanced along the conveyor, in the present example the conveyor chain 2, without any malfunction occurring.

Figure 1B:
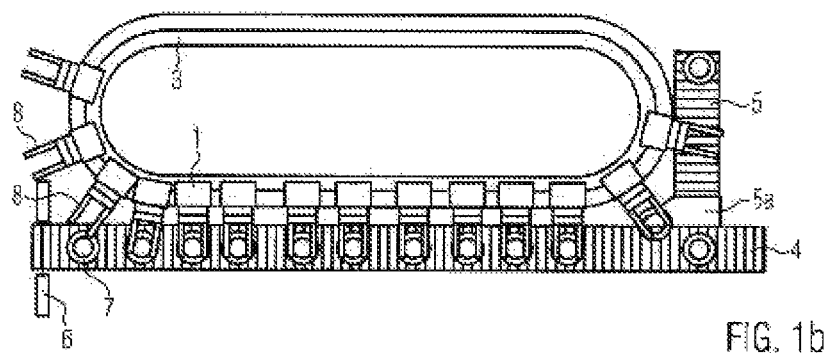
FIG. 1b shows a schematic top view of an example of a monitoring system.

FIG. 1b shows a top view of an example of a monitoring system. Such a monitoring system may comprise e.g. a region like that in FIG. 1a, but need not necessarily comprise a region like that in FIG. 1a. For example, the weighing region and/or the conveyor may be configured differently.

In the example shown, the carriages are arranged such that they circulate in a loop. In the example shown, the intended direction of movement is from the left to the right. When the monitoring system is running, the carriages 1 are here conveyed along the track 3, which has the shape of a loop in the present example. The monitoring system has transmitted thereto the information as to when a new container is introduced on the conveyor 4. In the present example, this information is provided by a message from sensor 6, which detects when a container 7 moves past it. The monitoring system may (but need not) comprise the sensor 6. In the example shown, the sensor 6 is exemplarily arranged at the beginning of the conveyor 4.

In addition, the conveying speed of the conveyor 4 can be taken into consideration and the route of the container can be predicted. In a monitoring system according to the present invention, the carriages may e.g. reach speeds between 0 and 4 m/s (or more). Typical acceleration values for carriages, which may be comprised in a monitoring system according to the present invention, may be up to 50 m/s$^2$ or more.

Typically, a carriage 1 is then controlled such that it takes up the container 7, guides it along the conveyor 4, while measuring the weight of the filled container, e.g. in a weighing region, in which the conveyor is lowered and/or the track of the carriage is raised.

Previously, the carriage 1 may have occupied a waiting position. As shown in the present example, the track of the carriage may be arranged (or adapted to be arranged) such that, in the area preceding the area where the track runs along the conveyor, it runs along a curve and towards the conveyor. The carriage can thus approach the conveyor and cause the container 7 to move precisely into the (mechanical) clamping device, which is here exemplarily configured as a clamp 8.

According to other embodiments, a suction device or some other fastening facilities (not shown) may be used instead of or in addition to a clamping device.

After the weighing region, the container 7 is returned to the conveyor 4 and the (mechanical) clamping device can be opened. The container can then exit unhindered. This will typically be the case if all the measurements show that the filled container satisfies the necessary quality criteria, i.e. the weight within the tolerance limits, by way of example. In the example shown, the conveyor is configured in one piece and exhibits a linear shape. According to other embodiments, it may, however, additionally comprise a transfer section and/or it may be bipartite and/or configured with an interruption (not shown).

In the example shown, the track of the carriage runs away from the conveyor 4 along a curve after the weighing region, when seen in the direction of movement, whereby the container can more easily exit the exemplarily shown clamping device. According to other embodiments, the track of the carriage may be routed differently.

If the necessary quality criteria are not fulfilled, the container will typically not be released by the carriage on the conveyor, i.e. in the example shown the clamping device will not be opened, but, due to restricted guidance by means of the carriage, the container will be discharged onto an optional discharge unit 5 and the clamping device will be opened only there.

Subsequently, the carriage can be moved away from the discharge unit, e.g. through a curve in its track, as in the case of the example shown, so that the container will be able to exit unhindered on the discharge unit.

In the example shown, the discharge unit 5 is depicted as a discharge track that may e.g. comprise a conveyor chain. According to this example, conveyance is exemplarily effected via an optional transfer section 5a onto the discharge track. According to other embodiments, a monitoring system may also be configured without a transfer section and/or it may comprise more than one discharge unit.

Figure 2:
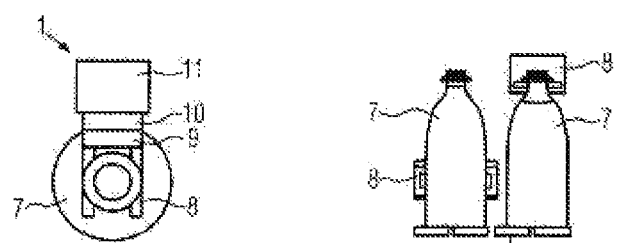
FIG. 2 shows a schematic representation of an example of a carriage.

FIG. 2 shows an exemplary carriage 1, which is capable of retaining a container 7.

In the example shown, a carriage comprises a clamping device, exemplarily depicted as a clamp 8, for containers 7. Such a clamping device may be controllable pneumatically, electrically or in some other way, and in particular it may comprise a clamp that is controllable in this way. A control facility for the clamping device in the form of an actuator 9 is exemplarily shown in FIG. 2 in a schematic representation. Such an actuator may be operated electrically, pneumatically or in some other way.

According to other embodiments, the container may be retained by means of a suction device, instead of or in addition to a clamping device, e.g. by generating a vacuum or by causing some other suction effect, or in some other way by means of fastening facilities.

A carriage 1 includes a load cell 10 and comprises typically also a mechanical guide 11 by means of which the carriage can be guided along a track along the linear motor.

Figure 3:
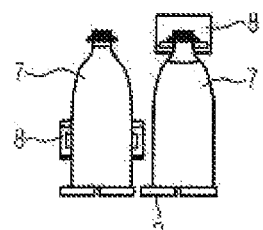
FIG. 3 shows examples of possible retaining positions.

As can be seen in FIG. 3, a carriage may act on containers by means of its clamping device, e.g. the clamp 8, at various container positions of containers on a conveyor belt 2.

In particular, and this is preferably done in the case of cylindrical containers, it may act on the body, as shown in the case of the left container 7 of FIG. 3, or, as is especially the case with plastic bottles, in the area of the container head or of the carrying ring of the container 7.

Instead of or in addition to a clamping device, also a suction device and/or some other fastening facility may be used, which may also act on various points of a container, e.g. on the body, in the area of the container head and/or of the carrying ring of a container.

What is claimed is:

1. A method for monitoring a filled container which is conveyed on a conveyor, comprising:
    taking up the container by a carriage,
    creating a spacing between the container and the conveyor, so that the entire weight of the container is retained by the carriage in a weighing region,
    weighing the retained container in the weighing region using a load cell comprised by the carriage, wherein the carriage is controlled such that it takes up the container and guides it along the conveyor while measuring the weight of the filled container,
    the carriage being driven by a linear motor.

2. The method according to claim 1, further comprising one of discharging, after weighing, the retained container by the carriage from the conveyor onto a discharge unit, or moving the retained container to a position close to the conveyor and releasing it on the conveyor.

3. The method according to claim 1, comprising monitoring a plurality of containers, the spacing between the individual carriages being selectively changed.

4. A monitoring system for filled containers, for executing a method according to claim 1, wherein the monitoring system comprises a plurality of carriages and a conveyor, wherein each carriage is configured such that it is capable of retaining a container and comprises a load cell for weighing the retained container, and wherein the conveyor is lowered in the weighing region, and the monitoring system comprises a linear motor as a drive for the carriages.

5. The monitoring system for filled containers, for executing a method according to claim 1, wherein the monitoring system comprises a plurality of carriages, wherein each carriage is configured such that it is capable of retaining a container and comprises a load cell for weighing the retained container, and wherein the track of the carriage is raised in the weighing region, and the monitoring system comprises a linear motor as a drive for the carriages.

6. The monitoring system according to claim 4, wherein the carriages are capable of retaining a container by means of a mechanical clamping device.

7. The monitoring system according to claim 4, wherein the clamping device is controllable.

8. The monitoring system according to claim 4, wherein the monitoring system is adaptable to one or more container types.

9. The monitoring system according to claim 4, wherein the monitoring system comprises a sensor, which detects the presence of a container at a position on the conveyor.

10. The monitoring system according to claim 4, wherein the speed of the carriages is adjustable.

11. The monitoring system according to claim 4, wherein the carriages are arranged to circulate in a loop.

12. The monitoring system according to claim 4, wherein each carriage is controllable individually.

13. The monitoring system according to claim 1, wherein the monitoring system comprises a discharge unit and the carriages are configured such that they are capable of discharging the retained container from the conveyor onto the discharge unit; or the monitoring system comprises a waterdrop blow-off unit.

14. The monitoring system according to claim 4, wherein the carriages comprise means for applying pressure to the container.

15. A non-transitory machine-readable medium comprising machine-readable instructions, which, when executed by a processor, are capable of controlling a monitoring system according to claim 4.

16. A non-transitory machine-readable medium comprising machine-readable instructions, which, when executed by a processor, are capable of controlling the execution of a method according to claim 1.

17. The method according to claim 1, wherein the speed of the carriage is changed such that the carriage will be moved closer to a preceding carriage or such that the distance to the preceding carriage will be enlarged.

* * * * *